（12）United States Patent
Albers et al.

(10) Patent No.: US 8,941,733 B2
(45) Date of Patent: Jan. 27, 2015

(54) VIDEO RETRIEVAL SYSTEM, METHOD AND COMPUTER PROGRAM FOR SURVEILLANCE OF MOVING OBJECTS

(75) Inventors: Rob Albers, Nijmegen (NL); Egbert Jaspers, Well (NL); Rob Wijnhoven, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 862 days.

(21) Appl. No.: 11/995,130

(22) PCT Filed: Feb. 27, 2006

(86) PCT No.: PCT/EP2006/060301
§ 371 (c)(1),
(2), (4) Date: Jan. 9, 2008

(87) PCT Pub. No.: WO2007/096004
PCT Pub. Date: Aug. 30, 2007

(65) Prior Publication Data
US 2008/0316311 A1    Dec. 25, 2008

(51) Int. Cl.
*H04N 7/18* (2006.01)
*G06F 17/30* (2006.01)
*G08B 13/196* (2006.01)

(52) U.S. Cl.
CPC ...... *G06F 17/3079* (2013.01); *G06F 17/30811* (2013.01); *G06F 17/30831* (2013.01); *G08B 13/19645* (2013.01)
USPC .......................................... 348/143; 348/149

(58) Field of Classification Search
CPC ........................................................ G06T 7/20
USPC ................................................. 348/143, 149
See application file for complete search history.

(56) References Cited

U.S. PATENT DOCUMENTS

| 6,587,574 | B1 * | 7/2003 | Jeannin | 382/107 |
|---|---|---|---|---|
| 7,072,398 | B2 * | 7/2006 | Ma | 375/240.16 |

(Continued)

OTHER PUBLICATIONS

Black, J., et al: "Hierarchical Database for a Multi-Camera Surveillance System" Pattern Anaysis and Applications, Springer, New York, NY, US, Vol. 7, No. 4, Jun. 2005, pp. 430-446, XP001233299, ISSN:1433-7541.

(Continued)

*Primary Examiner* — David Lazaro
*Assistant Examiner* — Marie Georges Henry
(74) *Attorney, Agent, or Firm* — Michael J. Striker (57) ABSTRACT

Video surveillance systems are used to monitor public places, streets, buildings, cities and other premises or surroundings and comprise a multitude of cameras which are monitoring relevant points in the surroundings. One of the problems of surveillance systems is, that the multitude of cameras produce a large amount of video data to be monitored, which requires a lot of human observers resulting in high personnel costs. A video retrieval system (1) connectable to a plurality of surveillance cameras (2) for monitoring a surroundings is proposed, the video retrieval system (1) comprising: displaying means (12) realized to display a graphical overall description (100, 130, 140) of the surroundings under surveillance, whereby the graphical overall description (100, 130, 140) comprises a plurality of monitored areas (110), whereby the areas are allocated to different surveillance cameras (2) and whereby the graphical overall description (100, 130, 140) is displayed in a single perspective view, and querying means (10) realized to formulate a trajectory-specific search (150, 160) query adapted to retrieve data about a moving object in the surroundings with a matching trajectory.

11 Claims, 4 Drawing Sheets

(56) References Cited

U.S. PATENT DOCUMENTS

| | | | | |
|---|---|---|---|---|
| 7,076,116 | B2* | 7/2006 | Horie | 382/284 |
| 7,076,117 | B2* | 7/2006 | Biermann et al. | 382/285 |
| 7,797,630 | B2* | 9/2010 | Kashi | 715/268 |
| 7,870,511 | B2* | 1/2011 | Suzuki | 715/861 |
| 7,885,781 | B2* | 2/2011 | Cannon et al. | 702/117 |
| 2003/0014401 | A1* | 1/2003 | Goloshubin et al. | 707/3 |
| 2003/0053658 | A1* | 3/2003 | Pavlidis | 382/103 |
| 2004/0041837 | A1* | 3/2004 | Yamaguchi et al. | 345/764 |
| 2010/0103266 | A1* | 4/2010 | Merkel et al. | 348/155 |

OTHER PUBLICATIONS

Pingali, GS., et al: "Instantly Indexed Multimedia Databases of Real World Events" IEEE Transactions on Multimedia IEEE USA, vol. 4, No. 2, Jun. 2002, pp. 269-282, XP002379541, ISSN: 1520-9210.

Collins, RT., et al: "Algorithms for Cooperative Multisensor Surveillance." Proceedings of the IEEE, IEEE New York, US. vol. 89, No. 10, Oct. 2001, pp. 1456-1477. XP002342459, ISSN: 0018-9219.

Jiao, L., et al: "Anatomy of a Multicamera Video Surveillance System." Multimedia Systems, vol. 10, No. 2, Aug. 2004, Pahes 144-163, XP002379542, Springer Verlag Berlin, ISSN: 0942-4962.

Lee, L., et al: "Monitoring Activities From Multiple Video Strams: Establishing a Common Coordinate Frame." IEEE Transactions on Pattern Analysis and Machine Intelligence. IEEE Service Center, Los Alamitos, CA, US, vol. 22, No. 8, Aug. 2000, pp. 758-767, XP0009676483, ISSN: 0162-8828.

Jaspers, EG., et al: "Candela-Storage, Alaysis and Retrieval of Video Content in Distributed Systems: Real-Time Video Surveillance and Retrieval" Multimedia and Expo, 2005. ICME 2005. IEEE International Conference on Amsterdam, The Netherlands 06-06 Jul. 2005, Piscataway, NJ, USA, IEEE, Jul. 6, 2005, pp. 1553-1556, XP010843967, ISBN: 0-7803-9331-7.

Hall, B., et al: "A Novel Graphical Interface and Context Aware Map for Incident Detection and Monitoring." 9th World Congress on Intelligent Transport Systems, [Online] Oct. 14, 2002, Oages 1-9, XP002379543, Chicago, Illinois, USA. URL:http://swiftlet.uscd.edu/aton/publications/pdfpapers/itswc_hall_1stsubmission.pdf.

A Hunter et al: "A Neural System for Automated Surveillance" Proceedings of the IEEE Symposium on Intelligent Distributed Surveillance Systems, Savoy Place, London, Feb. 2003, pp. 14/1-14/5 (In Enlgish).

* cited by examiner

VIDEO RETRIEVAL SYSTEM, METHOD AND COMPUTER PROGRAM FOR SURVEILLANCE OF MOVING OBJECTS

TECHNICAL FIELD OF THE INVENTION

This invention relates to a video retrieval system. More specifically the invention relates to a video retrieval system connectable to a plurality of surveillance cameras for monitoring a surroundings, the video retrieval system comprising displaying means realized to display a graphical overall description of the surroundings under surveillance, whereby the graphical overall description is displayed in a single perspective view, whereby the graphical overall description comprises a plurality of monitored areas and whereby each area is allocated to a different surveillance camera. Further the invention relates to a respective method and computer program.

BACKGROUND OF THE INVENTION

Video surveillance systems are used to monitor public places, streets, buildings, cities and other premises or surroundings and comprise a multitude of cameras which monitor relevant points in the surroundings. One of the problems of surveillance systems is, that the multitude of cameras produce a large amount of video data to be monitored, which requires many human observers resulting in high personnel costs.

A possible solution for reducing the costs is the use of video content analysis (VCA) systems, which detect and track objects over time in the video data. Such a VCA system is for example proposed in the scientific paper from A. Hunter, J. Owens and M. Carpenter: A neural system for automated CCTV surveillance, 2003, Proceedings of the IEEE Symposium on Intelligent Distributed Surveillance Systems, Savoy Place, London, February 2003.

The article describes a system for automated identification of suspicious pedestrian activity in a car-park. The system is based on the steps of segmentation of the objects of interest, tracking of the objects and identification of unusual trajectories of the objects. The cameras attached to the system are handled independently from each other, especially the generated video data and object-related meta-data is stored and processed separately.

Another possible solution of helping a guard in monitoring a multitude of cameras and thus a multitude of images is disclosed in the scientific article from B. Hall and M. M. Trivedi: A novel graphical interface and context aware map for incident detection and monitoring, 2002, 9th World Congress on Intelligent Transport Systems, Chicago, Ill., USA, October 2002, which appears to be closest state of the art. The Hall-paper discloses a novel graphical interface and a context aware map, whereby static and dynamic streams of information and especially live video images are merged into the context aware map and can be interactively viewed, rotated, zoomed etc. by a user with the help of the graphical interface. The merging of the information is realized by transforming camera images in real-time onto a scene map, which can be filled with satellite images for the parts, which are not covered by the camera images.

SUMMARY OF THE INVENTION

This invention proposes a video retrieval system with the features of claim 1, a method with the features of claim 11 and a computer program with the features of claim 12. Preferred and/or advantageous embodiments are defined by the dependent claims.

DETAILED DESCRIPTION OF THE INVENTION

The video retrieval system according to the invention is connectable and/or connected to a plurality or multitude of surveillance cameras. The connection is preferably carried out as a direct wire-connection and/or as a wired or wireless network connection.

The surveillance cameras are preferably realized as standard video cameras and/or adapted surveillance cameras like cameras with a field of view of 360°. Preferably the cameras are sensible for the visible light spectrum, i.e. 400 nm to 650 nm, alternatively one or more of the cameras is sensible for the UV-spectrum, which is from 300 nm to 400 nm, and/or for the near-infrared, which is from 650 nm to 900 nm, and/or for the infrared or far infrared. Especially night-vision cameras can also be used. The cameras are preferably positioned to monitor street crossings, large places and other locations with traffic junctions and/or streets, like highways.

A displaying means is realized to display a graphical overall description of the surroundings under surveillance. Preferably the displaying means is connected with a database containing the graphical overall description. The graphical overall description comprises and/or covers a plurality of monitored areas, whereby the areas are allocated to different surveillance cameras, whereby preferably each area is allocated to a different surveillance camera. Preferably the graphical overall description comprises at least two different areas monitored by two different cameras. In another embodiment the graphical overall description covers the monitored areas from all cameras connected to the video retrieval system. The graphical overall description is displayed in a single perspective view, especially so that the complete and/or whole graphical overall description is perspectively adapted and/or corrected relative to a single and/or common point of view. Preferably information of the individual monitored areas are described and/or describable by local coordinates, which describe the position of objects inside the 2-D image of a single camera and information of the graphical overall description is described and/or describable by global coordinates, which especially relate to a world coordinate system, for example GPS-coordinates. Preferably the images in local coordinates are linked to the overall description in global coordinates.

According to the invention the video retrieval system comprises querying means realized to formulate a trajectory-specific search query adapted to retrieve data about a moving object in the surroundings with a matching trajectory and/or to retrieve data about a plurality of moving objects with matching trajectories. The moving object is preferably a traffic participant, like a car or a truck, in alternative embodiments also persons, especially pedestrians are under surveillance. Trajectory-specific queries are preferably defined as queries which access—especially exclusively—the trajectory data of an object.

In particular the matching trajectory is defined as a trajectory of a moving object, whereby the trajectory matches with the trajectory-specific search query. Preferably the results of the trajectory-specific search query is displayed graphically and/or schematically on the graphical overall description.

The advantage of the invention is that the user has a very good overview of the surroundings under surveillance and is able to interpret returning results faster in the light of the graphical overall description compared to other surveillance systems known in the art. In a further embodiment the graphical overall description is realized as a virtual and/or real 3-D model of the monitored surroundings.

In a preferred embodiment the querying means comprises a graphical user interface which is embodied to enable a user to formulate the trajectory-specific query graphically and/or schematically and/or interactively on the graphical overall description. Preferably user-friendly tools for functions like zoom, rotate, translate, etc. of the graphical overall description are implemented.

Preferably the graphical user interface allows and/or enables the user to draw lines and/or curves and/or circles etc. on the graphical overall description for formulating search queries, for example sketch, line crossing or area-of-interest queries. In case of a sketch-query, the user draws a sketch of a trajectory or part of a trajectory, for example a hand-drawn line or a spline generated by a plurality of single interpolation points, on the overall description. As a possible result of a sketch-query object-identifications (IDs) of all objects having a trajectory similar and/or identical to the sketch are returned. The ID is preferably defined as a unique reference to a unique object in a data-base. In the case of a line-crossing, the user draws a line preferably perpendicular to the extension of a street or the like. As a possible result of a line-crossing-query, object-identifications (IDs) of all objects having passed the line are returned. In an area-of interest-query, the user draws a borderline of an area on the overall description. As a possible result object-identifications (IDs) of objects passing through, staying in or leaving the area are returned.

In a further preferred embodiment the graphical user interface is a man-machine-interface (MMI), which is realized as a typical peripheral user input device, for example a computer-mouse or computer-pen, keyboard, remote control, touch-pad, joystick, touch-screen, microphone for voice control etc.

Optionally the trajectory-specific queries are combined with further conditions like orientation conditions restricting the results for example to objects and/or trajectories moving along the sketched line or passing the line in a defined direction and/or object property conditions restricting the results for example to objects and/or trajectories, whereby the objects have a defined color, size, velocity, acceleration or the like and/or time conditions restricting the results to objects and/or trajectories, whereby the objects have a defined temporal behavior, like objects with a defined stop time for parking or the like. Further more such a condition could refer to the type (for example pedestrian, car bus) of the object.

The graphical overall description is preferably realized as a context aware map comprising and/or consisting of images from the plurality of cameras. The context aware map is advantageously generated by a perspective-corrected accumulation and/or addition of the images of the multiple cameras, preferably of synchronized images, which are referring to the same time. The perspective-corrected addition can be carried out as a four-point approximation, whereby only the edge points of each image are perspective-corrected positioned and the remaining points are arranged linearly displaced in respect to the edge points. Alternatively all image points (pixels) are perspective-corrected, which results in a higher processing time but in a distortion-reduced representation of the context aware map. "White" areas, which are areas temporarily or permanently not monitored by the cameras, are preferably supplemented by other information sources, for example CAD-data or map material. For a realization of a context aware map reference is made for example to the Hall-paper as discussed above, which is incorporated by reference in its entirety, especially concerning the context aware map. Alternatively the graphical overall description is realized as an overview representation of the monitored surrounding, especially a schematic map and/or a road map and/or an overview image, for example a satellite image and/or or satellite imagery and/or a combination thereof.

In a further preferred embodiment the video retrieval system comprises merging means which is realized for merging video information from video data of the multiple cameras into meta-data, whereby preferably video stream data and/or video sequences is/are used as the video data. According to this embodiment, the merging means is realized for merging object-related information from the video data of the multiple cameras into the meta-data, whereby object-related meta-data is created. The created meta-data is preferably detached and/or independently stored from the video data. Object-related information is a sub-group of the more general video information and comprises information about the moving object. Preferably the phrase "object-related information" is defined as data which comprises information, especially trajectory data, about a moving object derived from one single camera and further preferably described in local coordinates or a representative thereof referring to the single camera. Preferably the phrase "object-related meta-data" is defined as data which comprises information, especially trajectory data, about a moving object derived from a or the plurality of cameras and further preferably described in global coordinates, for example GPS-coordinates, or a representative thereof referring to the surroundings. The advantage of this embodiment is that the merging of the object-related information of multiple cameras into meta-data allows a high querying and retrieval performance, because the relevant data from the multiple cameras is pre-processed and considered at once in search queries.

In a first preferred alternative, the merging means is realized to merge the video data into a context aware map and to extract the object-related meta-data from the context aware map. In a second preferred alternative, the merging means is adapted to extract the object-related information from the video data of the single cameras and to link the object-related information to the object-related meta-data.

In the latter alternative the processing of the video data is preferably carried out in parallel and/or simultaneously for all cameras and is therefore fast. In the first alternative the allocation of the object related information of the multiple cameras to a related object is straightforward, as the object-related information is extracted from the video data of all cameras commonly, for example within a common software routine.

In a preferred embodiment the object-related information and/or meta-data comprises or consists of trajectory data and/or object tracking information of the moving object(s). Especially the object-related meta-data comprises trajectory data and/or object tracking information of one or more moving objects, whereby the object-related information from the single cameras are linked together. As a result trajectory data and/or tracking information comprised by the meta-data is joined over multiple cameras. The trajectory information or object tracking information is preferably a feature data set comprising all or a subset of the following data: time-dependent position, time- or position dependent velocity and/or acceleration of the object, date etc.

In a further preferred embodiment, the meta-data is indexing and/or referring to and/or pointing to the video data of the related object. The meta-data links to the single images and/or fragments and/or whole sequences of the video data. With this proposed data-architecture it is possible to access efficiently the various video data sequences from the multiple cameras without the need to search through the video data itself.

Preferably the extracted object-related meta-data is stored in a data-base, which comprises meta-data of a plurality of objects and/or meta-data resulting from at least several minutes, hours, days, months and/or years of observation time. Preferably the querying means is realized to access the object-related meta-data in order to perform the search queries. Further preferably the querying means allow to formulate a search query for similar trajectories and/or objects with similar trajectories by selecting the object-related meta-data of a desired object and/or the trajectory of the desired object and/or the desired object directly for example from a list of possible objects.

The method for retrieval of video data of one or more moving objects from multiple cameras with the features of claim 11 uses preferably a video retrieval system as disclosed above and as claimed in the claims 1 to 10. The computer program according to claim 12 comprises program code means for performing all the steps of claim 11 when said program is run on a computer and/or on a video retrieval system according to one of the claims 1 to 10.

BRIEF DESCRIPTION OF THE DRAWINGS

For a more complete understanding of the invention and the advantages thereof reference is now made to the following descriptions taken into conjunction with the accompanying drawings, wherein similar numbers designate the same objects. The drawings show.

DETAILED DESCRIPTION

Figure 1:
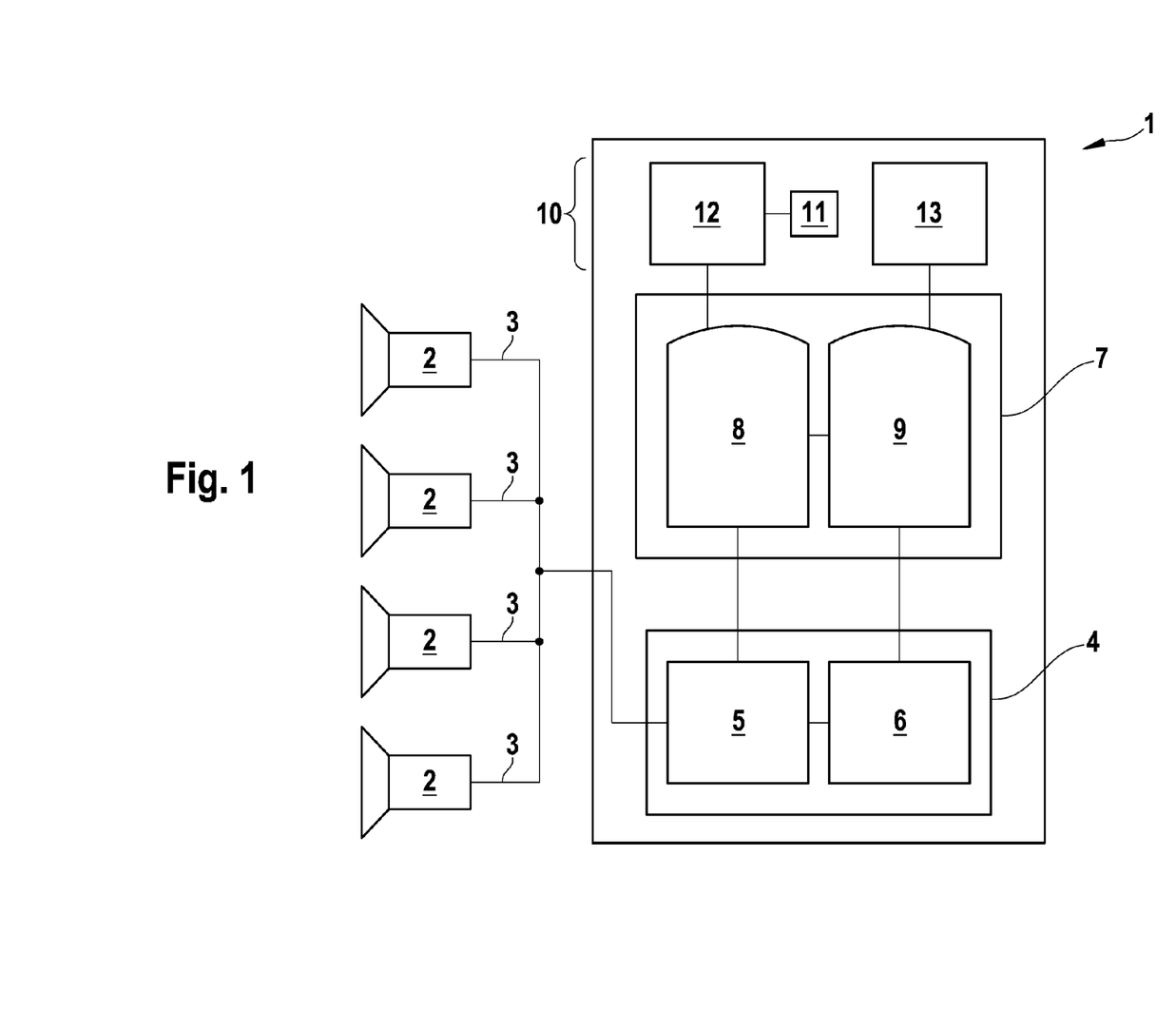
FIG. 1 a block diagram of a first embodiment of the video retrieval system according to the invention.

FIG. 1 shows a block diagram of a first embodiment of a video retrieval system 1. The video retrieval system 1 is connected to a plurality of surveillance cameras 2 by connections 3 for transmitting video data (video sequences), whereby the cameras 2 are positioned on relevant locations in a surroundings to be observed. The cameras 2 are for example positioned to monitor traffic crossings, streets and the like. In special applications the plurality of cameras 2 are positioned and/or realized to monitor a connected area, so that moving objects, for example cars, can be monitored over the connected area without interruptions. The connections 3 are realized as wires and/or as a wired or wireless network. Optionally video data from the cameras 2 can be saved on a memory device and imported to the video surveillance system 1 later on.

The video data from the cameras 2 is imported into a merging section 4 of the video retrieval system 1, which comprises a first subsection 5 for extracting and merging trajectory data of moving objects from the video data and thus creating object-related meta-data. In this first subsection 5 the incoming video data is processed by segmenting the single frames of the video data into static background and moving objects. In a further step these objects are detected, tracked over time and the locations of the objects in each frame of the video data are extracted. The set of location points of each object over the lifetime of the object is converted into a trajectory for each object. Preferably the extracting of the trajectory is performed for each camera 2 separately, so that for each camera 2 and for each moving object a local trajectory is created. In this case, in a further step all extracted local trajectories belonging to the same object are linked together to a global trajectory, whereby the plurality of the global trajectories represent the object-related meta-data. Alternatively some or all steps of extracting the trajectory is or are performed in the cameras 2.

Figure 2:
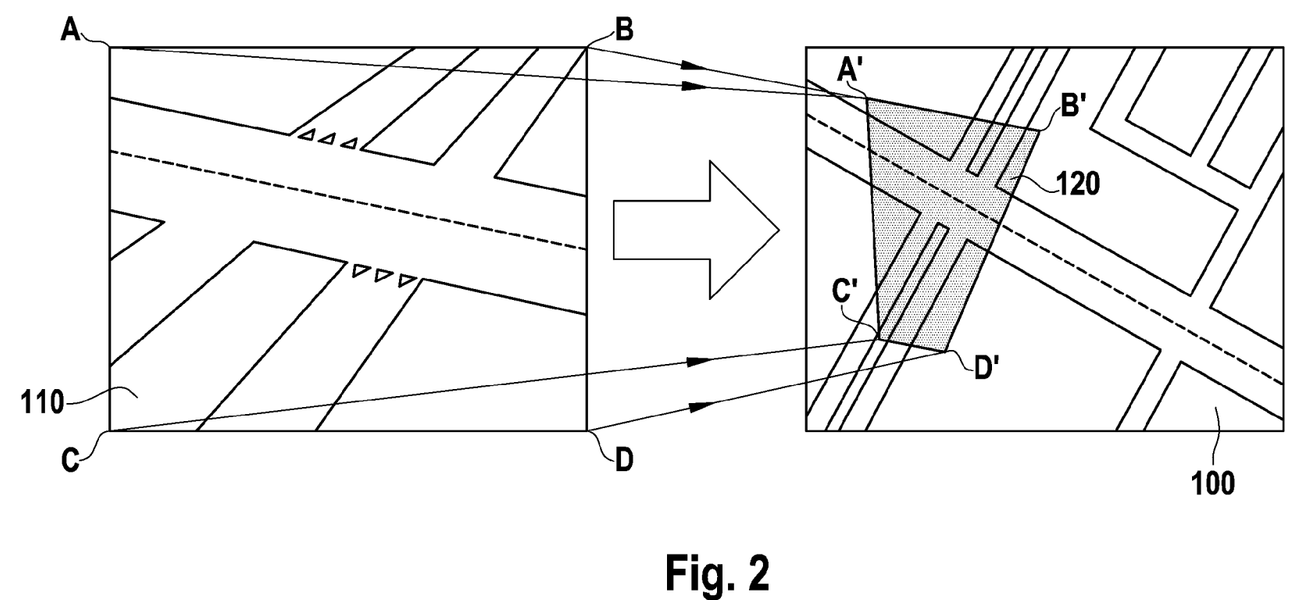
FIG. 2 an example for the rescaling and perspective-correcting of an image.

The incoming video data is transferred to a second subsection 6 for generating a context aware map 100 (FIG. 2). The context aware map 100 provides an overview over the surroundings under surveillance by accumulating the images of the single surveillance cameras 2 into a single overview image. A problem in connection with the context aware map 100 is, that the plurality of surveillance cameras 2 in general do not have the same scale and viewing angle, so that a simple adding of the images is normally not sufficient. For a better understanding of the step of generating the context aware map 100 in the subsection 6 reference is now made to FIG. 2.

FIG. 2 shows on the left side an image 110 from a surveillance camera 2 monitoring a traffic crossing. For the purpose of illustration, not a photographic image is shown in FIG. 2 although during operation of the video retrieval system 1 photographic images are used. In order to solve the above-mentioned problem the images of the surveillance cameras 2 are re-scaled and perspective-corrected to a common scale and viewing angle. For that reason, the edge points A, B, C and D of the image 110 are displaced or translated according to the common scale and viewing angle so that a re-scaled and perspective-corrected image 120 with new edge points A', B', C' and D' is generated. Optionally the remaining image points of the image 110 are also re-scaled and perspective-corrected or these remaining points are only—especially linearly—shifted in order to follow the edge points A, B, C and D. The adapted image 120 is fit into the context aware map 100 on its respective position as it is indicated with the arrow in FIG. 2. The context aware map 100 comprises adapted images from the plurality of cameras 2, whereby preferably all images are synchronized, so that the context aware map 100 shows a time dependent overview over the monitored area.

Returning now to FIG. 1, after the context aware map 100 of the images of the surveillance cameras 2 is generated the results from the merging section 4 are saved to a database section 7 comprising a trajectory database 8 and a video database 9. The video database 9 comprises the preferably time dependent context aware map 100 and the video data of the cameras 2 or parts thereof. In other words, the video sequence database 9 is an image memory. The trajectory database 8 is free or substantially free from image or video data and comprises the trajectory data extracted in the first sub-section 5 of the merging section 4. Preferably the trajectory data is organized as data sets, whereby each data set is related to one moving object and whereby each data set comprises all trajectory data of the moving object of multiple or all cameras 2. The trajectory data is meta-data which is linked to the related video data in the video database 9.

A querying interface 10 of the video retrieval system 1 comprises a peripheral user input device 11 and a first monitor 12 for inputting queries and a second monitor 13 for presenting the results of the queries. In alternative embodiments the two monitors 12 and 13 are realized as two windows or cameos on one common monitor or the information of the two monitors 12 and 13 are displayed in a common window or cameo.

Figure 4:
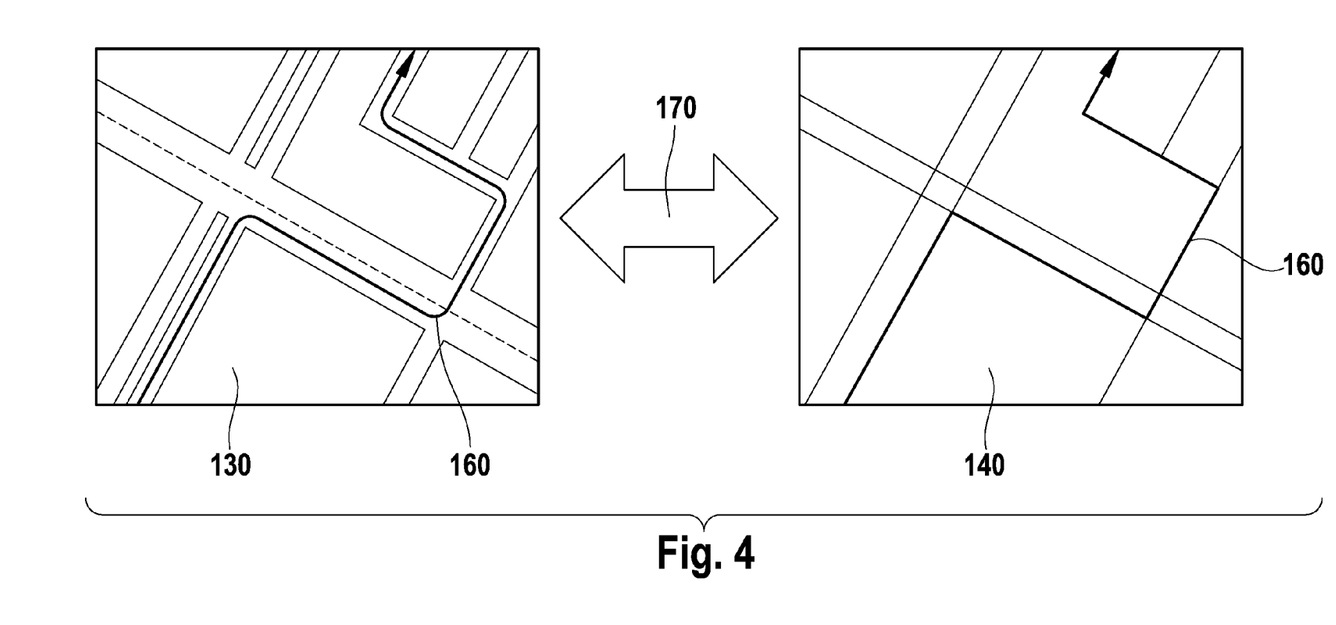
FIG. 4 a second example to illustrate the use of a satellite image and of a street map in connection with the video retrieval system in FIG. 1.

On the first monitor 12 an overview map is presented, which contains the views from all cameras 2. The overview map 130 is realized as an overview (for example satellite)

image 130 (FIG. 4) or as the context aware map 100 (FIG. 2). Alternatively a schematic street map 140 (FIG. 4) is used as overview map. In operation of the video retrieval system 1 the overview image 130 is a photographic image, but for the purpose of illustration the overview image 130 in FIG. 4 is only schematically shown.

With the help of the computer peripheral user input device 11 the user formulates queries on the trajectory data stored in the trajectory database 8. The queries are trajectory-specific such as trajectories by sketch or example, line-crossing or area of interest. In a trajectory-by-sketch query, a sketch is made by the user, preferably consisting of several line parts, connected together. The search returns all objects that have a trajectory similar to the query trajectory. The input of a line-crossing query is preferably one or more line segments. The search returns all objects that have a trajectory that crosses all or some of the query line segments. In an area-of-interest query, the search returns all objects that have a trajectory that overlaps with the query area.

Figure 3:
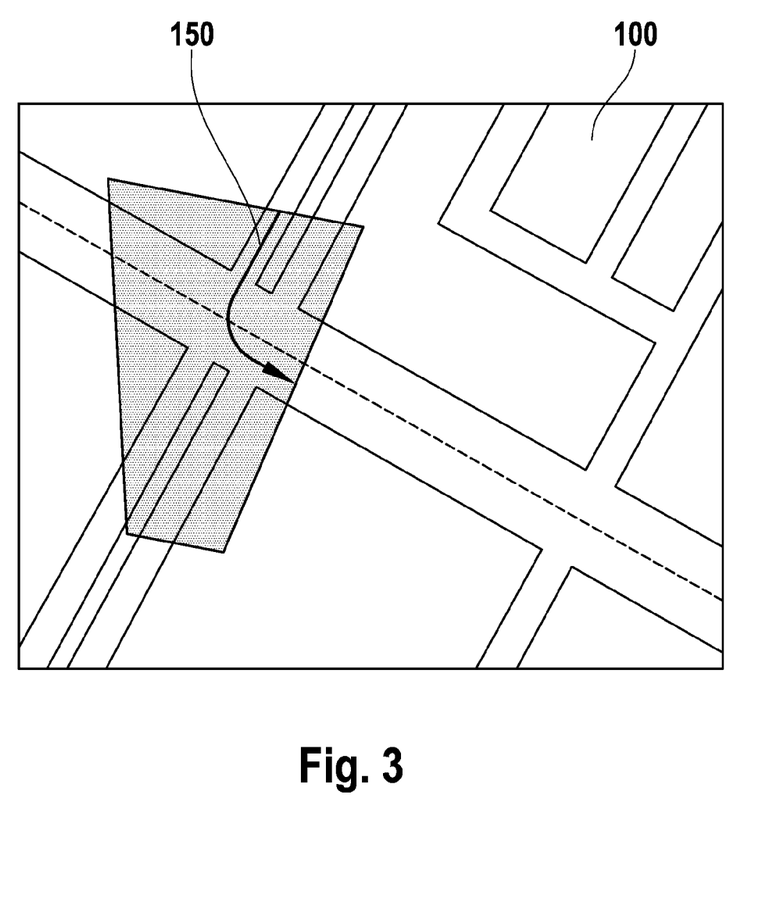
FIG. 3 a first example to illustrate a context aware map in connection with the video retrieval system in FIG. 1.

A first example for a trajectory-specific search is shown in FIG. 3, whereby a first sketch 150 of a trajectory query is marked directly on the context aware map 100. An example of a second sketch 160 of a trajectory query is shown in FIG. 4, whereby the second sketch 160 is marked on the satellite image 130 and/or on the street map 140.

As a result of the query, trajectories of an object and/or objects with their trajectories are returned, which are similar to the sketch trajectories 150 or 160, respectively. For achieving the query results, only the trajectory database 8 is accessed, so that the query is performed very efficiently. The results are displayed on the second monitor 13 and/or on the first monitor 12.

Additionally the user has the possibility to select a retrieved object or trajectory of special interest with the peripheral user input device 11. The retrieved object or trajectory as part of the trajectory data in the trajectory database 8 is directly linked to the corresponding video fragments stored in the video database 9 from the various surveillance cameras 2. As a response to the user selection, the video fragments or video data relating to the selected object or trajectory are displayed for example on a window or cameo on the first and/or second monitor 12 or 13 respectively.

In other words, the video retrieval system 1 exploits information extracted by object tracking algorithms, after combining this information over multiple cameras 2. After merging the object-related information over multiple cameras 2, the retrieval application can apply search queries using this combined data set. In particular, trajectory data of the detected objects in the database can be combined over multiple cameras 2. Intuitive user queries can be given using the overview map, whereby the user can draw for example the search trajectory onto this map. Summarized the video retrieval system 1 comprises a means for browsing through the video content, based on queries on object-trajectory data joined over multiple cameras 2, so that information is exploited in search queries considering data from multiple cameras at once.

The invention claimed is:

1. Video retrieval system connectable to a plurality of surveillance cameras for monitoring a surroundings, the video retrieval system comprising:
displaying means for displaying a graphical overall description of the surroundings under surveillance, whereby the graphical overall description comprises a plurality of monitored areas that are allocated to different surveillance cameras and whereby the graphical overall description is displayed in a single perspective view, and
querying means comprising a graphical user interface configured to enable a user to formulate a trajectory-specific search query graphically and/or interactively on the graphical overall description, the search query adapted to retrieve data about a moving object in the surroundings with a matching trajectory, and
wherein the graphical user interface enables users to draw any of the group consisting of lines, curves, circles, hand-drawn lines, a spline generated by a plurality of single interpolation points of the graphical overall description and any combination thereof, thereby formulating the search query, wherein the video retrieval system is characterized by merging means for merging object-related information of the video data of the plurality of cameras into object-related meta-data, and wherein the video retrieval system is characterized in that the merging means is realized to merge the video data into the overall description and to extract object-related meta-data from the overall description and/or to extract object-related information from the video data of the plurality of cameras and to link and/or merge the object-related information to generate the object-related meta-data.

2. Video retrieval system according to claim 1, characterized in that the graphical overall description of the surroundings is realized as a context aware map comprising images from the plurality of cameras and/or as an overview representation and/or a combination thereof.

3. Video retrieval system according to claim 2, characterized in that the context aware map is generated by an addition of perspective-corrected and/or rescaled images from the plurality of cameras.

4. Video retrieval system according to claim 1, characterized in that the object-related information and/or meta-data comprises and/or consists of trajectory data and/or object tracking information of the related object.

5. Video retrieval system according to claim 1, characterized in that the meta-data is indexing and/or referring to the video data of the related object.

6. Video retrieval system according to claim 1, characterized in that the querying means is adapted for performing the trajectory-specific search query on the meta-data.

7. Video retrieval system according to claim 1, characterized in that the graphical user interface is realized to directly select the object-related meta-data and/or trajectory of a desired object on the overall description.

8. The video retrieval system as set forth in claim 1, further comprising
merging means for merging object-related information of video data from the plurality of cameras into object-related metadata, the object-related metadata comprising trajectory data or object-tracking information or both and described in global coordinates referring to the surroundings,
wherein the querying means enables a user to formulate a trajectory-specific search query selected from the group consisting of trajectory-by-sketch query and trajectory-by-example query, wherein the matching trajectory is defined as a trajectory of a moving object that matches the trajectory-specific search query and wherein the querying means enables access to the object-related meta-data in order to perform the search queries.

9. Method for retrieval of video data of one or more moving objects from a plurality of surveillance cameras comprising steps of:

- displaying a graphical overall description of a surroundings under surveillance, whereby the graphical overall description comprises a plurality of monitored areas allocated to different surveillance cameras and whereby the graphical overall description is displayed in a single perspective view, and
- formulating a trajectory-specific search query adapted to retrieve data about a moving object in the surroundings with a matching trajectory, the search query formulated graphically and/or interactively on the graphical overall description using a graphical user interface that enables users to draw any of the group consisting of lines, curves, circles, hand-drawn lines, a spline generated by a plurality of single interpolation points of the graphical overall description, and any combination thereof, thereby formulating the search query.

10. A computer program comprising program code means stored on a non-transitory medium and programmed for performing all the steps of claim 9 when said program is run on a computer and/or on a video retrieval system as set forth in claim 1.

11. Video retrieval system connectable to a plurality of surveillance cameras for monitoring a surroundings, the video retrieval system comprising:

- displaying means for displaying a graphical overall description of the surroundings under surveillance comprising a single perspective view of a plurality of monitored areas that are allocated to different surveillance cameras,
- merging means for merging object-related information of video data from the plurality of cameras into object-related metadata, the object-related metadata comprising trajectory data or object-tracking information or both and, described in global coordinates referring to the surroundings, and
- querying means comprising a graphical user interface configured to enable a user to formulate a trajectory-specific search query selected from the group consisting of trajectory-by-sketch query and trajectory-by-example query,
- wherein the trajectory-specific search query is adapted to retrieve data about a moving object in the surroundings with a matching trajectory and the matching trajectory is defined as a trajectory of a moving object that matches with the trajectory-specific search query, and
- wherein the querying means accesses the object-related metadata in order to perform the search queries.

* * * * *